United States Patent [19]

McGee

[11] 4,041,820
[45] Aug. 16, 1977

[54] VENEER CLIPPER

[75] Inventor: David L. McGee, Portland, Oreg.

[73] Assignee: Plymak Company, Inc., Portland, Oreg.

[21] Appl. No.: 522,576

[22] Filed: Nov. 11, 1974

[51] Int. Cl.² .............................................. B27L 5/08
[52] U.S. Cl. .................................... 83/356.2; 83/659; 83/582; 83/563; 83/561
[58] Field of Search ...................... 83/356.2, 563, 561, 83/659, 355, 582, 700, 562

[56] References Cited

U.S. PATENT DOCUMENTS

| | | | |
|---|---|---|---|
| 2,405,598 | 8/1946 | Miller | 83/659 X |
| 3,837,250 | 9/1974 | Lumm | 83/659 X |
| 3,850,066 | 11/1974 | Shaughnessy | 83/659 X |

FOREIGN PATENT DOCUMENTS

| | | | |
|---|---|---|---|
| 556,038 | 2/1957 | Italy | 83/659 |

Primary Examiner—Donald R. Schran
Attorney, Agent, or Firm—Klarquist, Sparkman, Campbell, Leigh, Hall & Whinston

[57] ABSTRACT

An anvil roll has a steel core and an outer portion of polyurethane. The roll is slightly rotated after a number of veneer clipping operations by a clutch which drives the roll after the roll is pushed by a knife down away from arcuate braking surfaces. An airbag normally urges the roll into engagement with the braking surfaces and is collapsed during adjustment of the roll. Operation of the clutch is prevented during the clipping operation. A double-acting cylinder drives the knife through a toggle joint linkage, and cushioning cylinder means aid in overcoming inertia of the knife at the start of a clipping cycle and also cushion the return of the knife. The cylinder has poppet check valves to rapidly admit air thereto.

16 Claims, 7 Drawing Figures

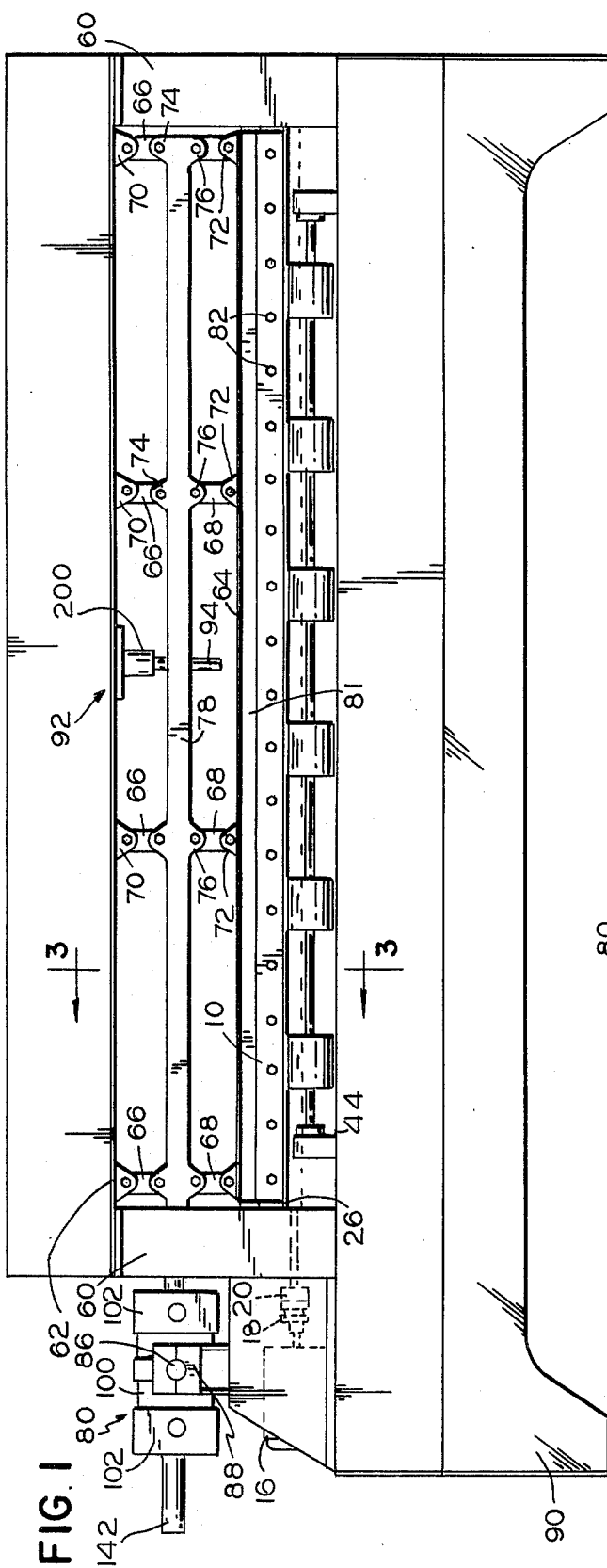
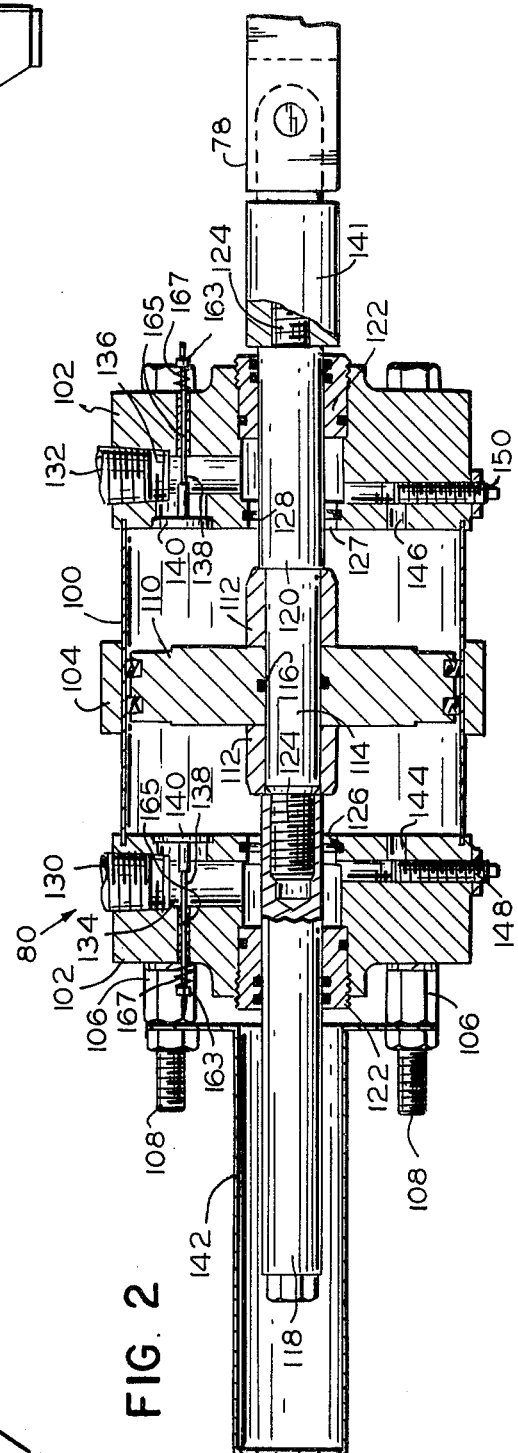
FIG. 1
FIG. 2

FLOW OF MATERIAL

VENEER CLIPPER

DESCRIPTION

This invention relates to an improved veneer clipper, and has for an object thereof the provision of an improved veneer clipper.

Another object of the invention is to provide a veneer clipper having an anvil roll provided with an elastomeric periphery.

A further object of the invention is to provide a veneer clipper having an anvil roll having a cushioning periphery.

Another object of the invention is to provide a veneer clipper having an anvil roll which is rotated slightly after a number of clipping operations.

Another object of the invention is to provide a veneer clipper having an anvil supported by rollers and rotated slightly.

Another object of the invention is to provide a veneer clipper having an anvil roll which is rotated by a clutch actuated by a timing means when there has been a predetermined number of clippings.

Another object of the invention is to provide a veneer clipper having a cylinder drive with poppet valves serving as check valves.

Another object of the invention is to provide a veneer clipper in which a drive cylinder drives a toggle drive to move a clipping knife carriage and a second cylinder drive acts on the carriage to accelerate it in its clipping stroke and to cushion it in its retracting stroke.

Another object of the invention is to provide a veneer clipper having a cylinder drive operable to reciprocate a knife carriage in a clipping stroke and a retracting stroke and booster means adapted to accelerate the movement of the knife carriage in its reciprocation.

In the drawings:

FIG. 1 is a fragmentary front elevation view of an improved veneer clipper forming one embodiment of the invention;

FIG. 2 is an enlarged, fragmentary vertical sectional view of a portion of the improved veneer clipper of FIG. 1;

Figure 3:
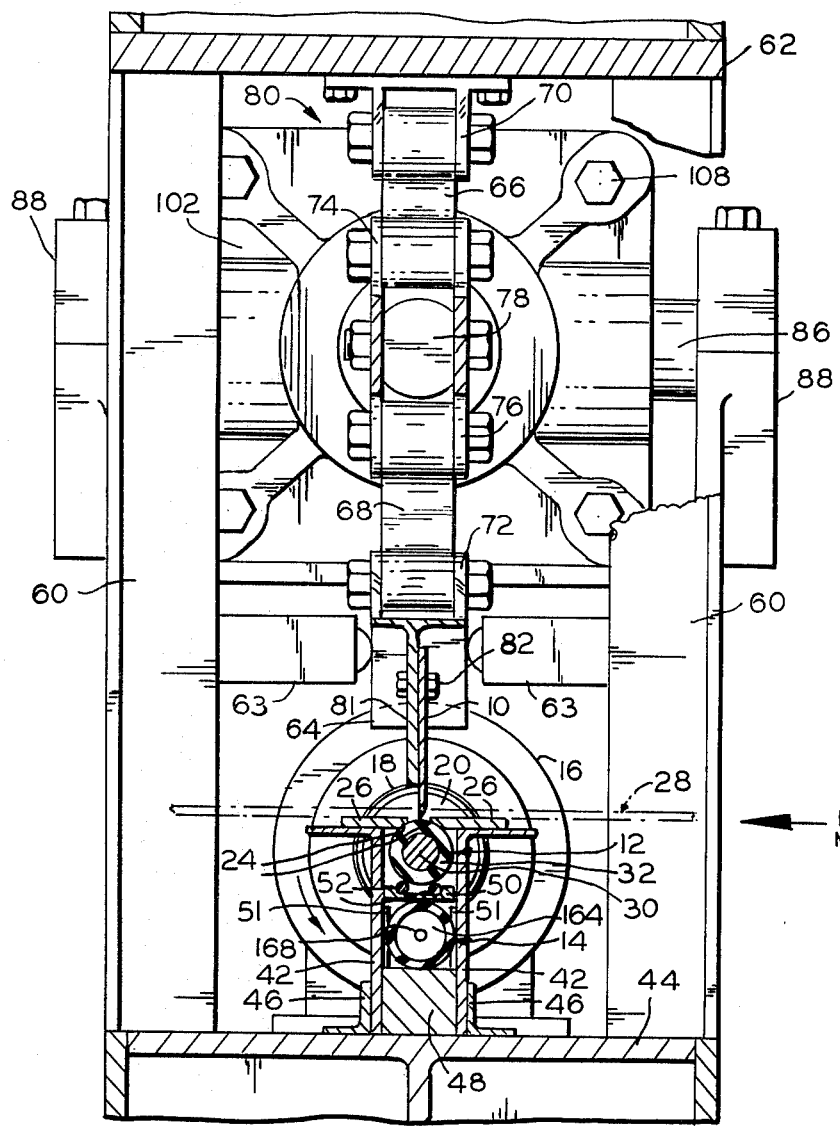
FIG. 3 is an enlarged, fragmentary vertical sectional view taken along line 3—3 of FIG. 1.

Referring now in detail to the drawings, there is shown therein an improved veneer clipper forming on specific embodiment of the invention and including a knife 10 reciprocated rapidly relative to a resilient anvil roll 12 (FIG. 3) backed up by an airbag 14. The anvil roll is rotated through a small angle by an electric motor 16 (FIG. 4), and electrically actuated clutch 18, a coupling 20 and a flexible cable 22 acting as a flexible shaft. The clutch 18 may be an air actuated clutch if desired. The motor 16 is rotated continuously, and the clutch 18 is pulsed to drive the anvil roll after the airbag 14 is collapsed to permit the anvil roll to move slightly down away from arcuate braking lips 24 of plates 26 supporting a veneer strip 28. The lips act as a brake when the roll is pressed thereagainst.

The anvil roll 12 (FIG. 3) includes a steel core 30 and a resilient cover or sleeve 32 of elastomeric material such as, for example, 90 durometer polyurethane. A pin 34 (FIG. 4) extends through a slot 36 in a ferrule 38 fixed to the flexible cable 22 and slidable in a socket 40 in the core 30. The pin 34 splines the cable 22 to the core. The anvil roll is loosely restrained laterally by L-shaped plates 42 (FIG. 3) fixed to frame member 44, angle members 46 being rigidly secured to the member 44 and the plates 42. A bar 48 positioned between the plates 42 backs up the airbag 14, and a channel member 50 is vertically slidable along the plates 42 and drops down to and rests on stops 51 when the airbag is collapsed. The anvil roll rests on rollers 52 rotatably supported by the channel member 50. The rollers 52 press against the cover 32 to smooth out or "heal" the periphery of the cover.

Corner angle members 60 (FIGS. 1 and 3) rigidly mounted on the member 44 support top frame member 62, and carry known needle bearing guides 63 vertically guiding knife supporting carriage 64. Toggle links 66 and 68 pivotally secured to clevises 70, 72, 74 and 76 form toggle joint linkages with the member 62, actuating bars 78, and the carriage 64. The carriage 64 has a knife support 81 to which the knife 10 is secured by bolts 82. A double-acting cylinder or primary cylinder drive 80 mounted by trunnions 86 supported by bearings 88 fixed to frame member 44 is adapted to move the actuating bars 78 in one direction for one clipping, and move the bars in the opposite direction for the succeeding clipping. The drive very rapidly moves the knife 10 down through the toggle joint linkages to cut through the veneer 28 and to rapidly retract the knife upwardly after such a clipping operation. The frame member 44 is supported by base 90. A continuously pressurized accelerating and cushioning cylinder drive 92 directly engages the knife carriage at all times except from just before the knife engages the veneer to cut the veneer to just after the knife is disengaged from the veneer. For example, the stroke of the knife might be about three inches, and, for one-eighth inch thick veneer, engages and clips the veneer only during the last one-eighth to three-sixteenths of an inch of its downward stroke. The knife engages the veneer as it is retracted only for about the first three-sixteenths of an inch of its return stroke. Piston rod 94 of the accelerating and cushioning cylinder drive 92 engages the carriage during only the first 2 inches of the downward stroke of the carriage to accelerate the knife and engages the carriage during only the last 2 inches of the return of the carriage to cushion the return of the carriage.

The double-acting cylinder 80 (FIG. 2) includes a sleeve 100, heads 102, a mounting ring 104 and spacers 106 held together by tie rods 108. A piston 110 slidable in the sleeve 100 is positioned between valve members 112 having tapered ends mounted on rod 114 sealed to the piston by O-ring 116. Piston rods 118 and 120 are slidable in bushings 122 screwed into the heads 102 and are screwed onto threaded end portions 124 of the rod 114. The valve members 112 are movable into and slidable along bores 126 and 127 formed in the heads 102, and O-rings 128 sealingly engage the valve members. Lines 130 and 132 are connected to ports 134 and 136 leading to the bores 126 and 127. Poppet valves 138 having heads 140 act as check valves and are mounted in passages in the heads 102 in communication with the ports 134 and 136. The actuating bars 78 are pivotally connected to the piston rod 120 by a rod end 141 (FIG. 2). A cover 142 covers the piston rod 118. T-shaped bleeder passages 144 and 146 in the heads 102 connect the ends of the cylinder to the passages 126 and 127, and needle valves 148 and 150 are screwed into the passages 144 and 146.

Figure 4:
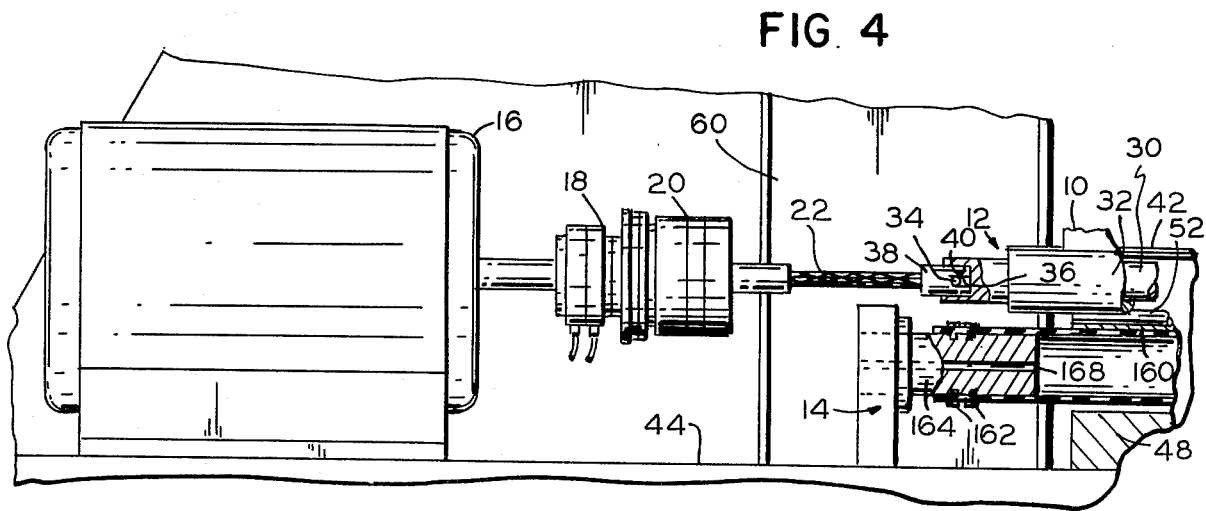
FIG. 4 is an enlarged, fragmentary, partially sectional front elevation view of a portion of the improved veneer clipper of FIG. 1.

The airbag 14 includes a resilient tube 160 sealed by hose clamps 162 to a bleeder bushing 164 (FIG. 4) and an inlet bushing (not shown) at the other end of the tube 160. The bleeder bushing has a continuously open, small bleeder passage 168 (FIGS. 3 and 4).

The piston 110 is shown in FIG. 2 about halfway through one of its strokes. At the start of a clipping cycle, the piston is either at one end or the other of the cylinder sleeve 100, and the valve member 112 at that end plugs the bore 126 or 127 and air under pressure is supplied by the line 130 or 132 at that end. The air under pressure opens the valve 138 at that end to rapidly supply the air to the adjacent end portion of the cylinder and rapidly drives the piston 110 to the opposite end of the cylinder. After the initial portion of this stroke, the valve member 112 pulls out of its bore 126 or 127 and the air flows into the cylinder through that bore, a spring 160 of the adjacent poppet valve 138 closing that poppet valve. Air is exhausted from the other end of the cylinder through the line 130 or 132 and the adjacent bore 126 or 127 until near the end of the stroke of the piston when the forward one of the valve members 112 enters the bore 126 or 127. Then a cushioning action takes place, the air being exhausted only through the bleeder port 144 or 146, as controlled by the adjustable needle valve 148 or 150. In the next clipping operation, the piston is driven in the opposite direction. Nuts 163 screwed on rods 165 of the poppet valves 138 hold springs 167 on the rods. The nuts are readily accessible for adjustment from the outside of the cylinder.

Figure 5:
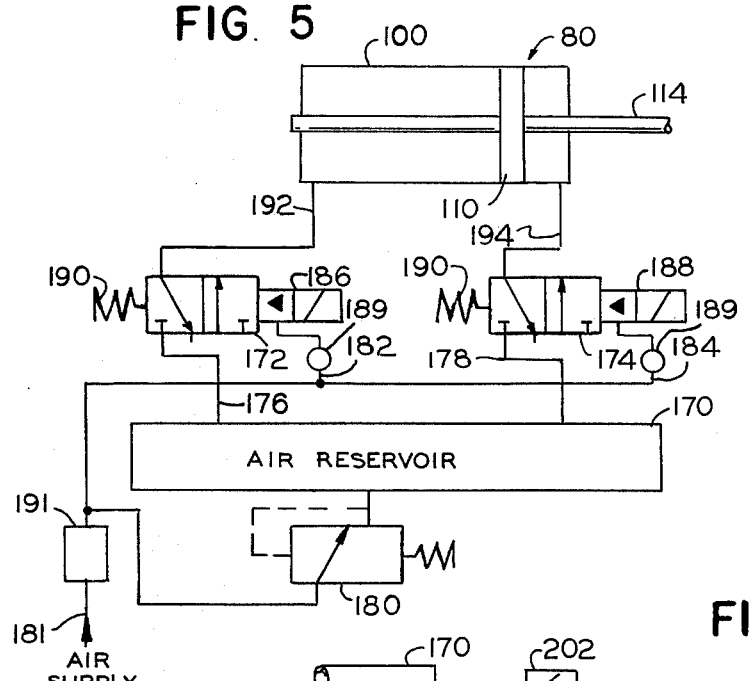
FIG. 5 is a schematic view of the electro-pneumatic control circuit of the improved veneer clipper of FIG. 1.

In FIG. 5 there is shown the pneumatic circuit of the primary cylinder drive 80. Air under pressure is supplied from a reservoir 170 of air under pressure to valves 172 and 174 through lines 176 and 178. Air is supplied to the reservoir 170 through air regulator 180 from an air supply source through a line 181. Air from the line 181 is supplied by lines 182 and 184 to solenoid actuated pilot valves 186 and 188 of the valves 172 and 174. Springs 190 bias the valves 172 and 174 toward their exhaust conditions. For one clipping operation, a known standard scanner circuit which has a manual override actuates one of the solenoids of the valves 186 and 188 to change the condition of that valve to connect one end of the cylinder 100 through line 192 or 194 to air under pressure, the other valves 172 or 174 connecting the other end of the cylinder 106 to exhaust. For the next clipping operation, the conditions of the valves 172 and 174 are reversed and the piston 110 is pushed in the opposite direction. Pressure regulating valves 189 are in the lines 182 and 184, and a filter 191 is in the line 181.

Figure 6:
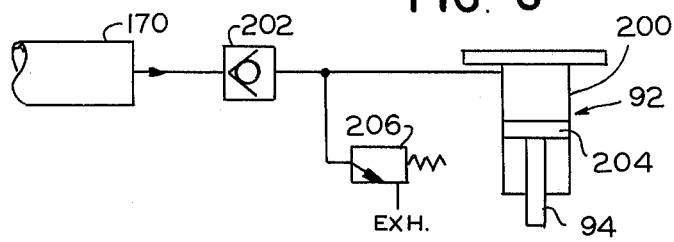
FIG. 6 is a schematic view of a pneumatic control circuit of the improved veneer clipper of FIG. 1; and, FIG. 7 is a schematic view of an electrical control circuit of the improved veneer clipper of FIG. 1.
Figure 7:
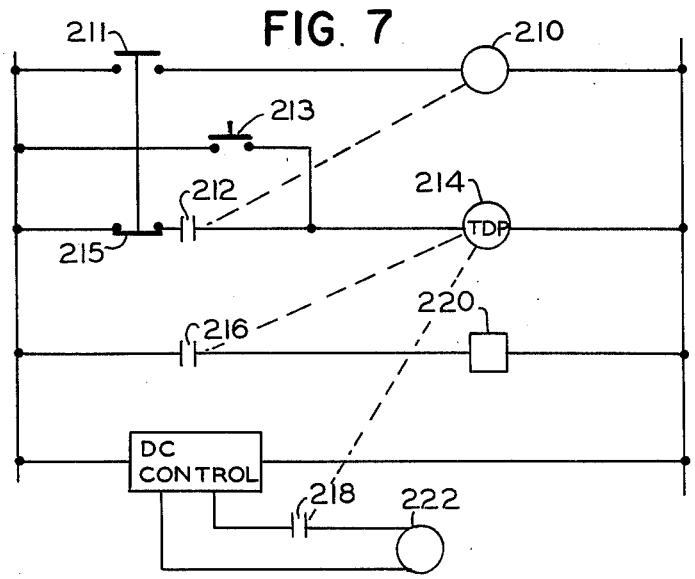

The cushioning cylinder drive 92 has air under pressure supplied continuously to upper end of cylinder 200 thereof from a check valve 202 (FIG. 6). Then, during the cushioning operation when piston 204 is driven upwardly as the knife carriage 64 is returned to its upper or start position, excess air is forced out of pressure relief valve 206, the valve 206 being set somewhat above line pressure of the air supplied by the check valve 202. When a predetermined number of clipping cycles have occurred, a counter 210 (FIG. 7), which is actuated once each clipping cycle by a knife-actuated switch 211, closes switch 212 to a timer 214, contacts 215 of the knife switch being closed at the end of each clipping cycle. The timer 214 immediately closes contacts 216 and 218. The closing of the contacts 216 energizes solenoid winding 220 of a valve (not shown) to collapse the airbag 14. Closing contacts 218 actuates winding 222 of the clutch 18 to cause the roll 12 to be turned through a few degrees, 5°, for example. The timer then resets to zero. A manual override switch 213 is provided.

The above-described veneer clipper very rapidly clips the continuously moving strip of veneer, being in the wood only 12 milliseconds or less and using up less than 100 milliseconds for each entire clipping operation, the veneer strip moving about 600 feet per minute. The full clipping stroke of the knife 10 is fairly long, for example, somewhat over 3 inches, to permit debris to pass through the clipper, while in only about the last three-sixteenths of an inch of the clipping stroke of the knife is the wood engaged by the knife. The rapid start given the knife by the cushioning cylinder drive 92 increases the speed of the knife throughout the clipping stroke. The knife-actuated switch contacts 215 are broken whenever the knife is not retracted, which drops out the timer 214 and to prevent adjustment of the anvil roll whenever a clipping operation is taking place.

I claim:
1. An improved veneer clipper,
a knife,
means for reciprocating the knife,
anvil means having a cushioning portion,
support means mounting the anvil means in a position in which the cushioning portion is opposite the knife and is engaged by the knife when the knife is reciprocated,
means for shifting the cushioning portion of the anvil means laterally of the knife to change the part of the cushioning portion that is engaged by the knife,
braking means,
intermittently operable releasable means urging the anvil means against the braking means,
and means for preventing operation of the shifting means when the knife is moved toward the cushioning position.

2. The improved veneer clipper of claim 1 wherein the anvil means comprises a roll.

3. The improved veneer clipper of claim 2 wherein the releasable means comprises air bag means urging the anvil roll against the braking means.

4. The improved veneer clipper of claim 3 wherein the releasable means includes a sliding member engaged by the air bag and the anvil roll.

5. The improved veneer clipper of claim 4 wherein the releasable means includes a pair of spaced rolls on the sliding member and rotatably supporting the anvil roll.

6. In an improved veneer clipper,
a knife,
means for reciprocating the knife,
an anvil roll having a cushioning peripheral portion,
support means mounting the anvil roll rotatably in the path of the knife,
drive means for rotating the anvil roll,
brake means for braking rotation of the anvil roll,
and means for concurrently stopping the drive means and actuating the brake means and concurrently operating the drive means to rotate the roll and release the brake means.

7. The improved veneer clipper of claim 6 wherein the support means includes backing means urging the anvil toward the knife.

8. The improved veneer clipper of claim 7 wherein the cushioning peripheral portion is of an elastomeric material.

9. The improved veneer clipper of claim 8 wherein the backing means includes rounded smoothing means engaging the cushioning peripheral portion of the anvil roll.

10. The improved veneer clipper of claim 9 wherein the backing means includes an air bag supporting the smoothing means.

11. The improved veneer clipper of claim 10 wherein the drive means includes intermittently operable means for rotating the anvil roll.

12. The improved veneer clipper of claim 11 including means synchronized with the reciprocation of the knife for actuating the braking means.

13. The improved veneer clipper of claim 6 wherein the drive means includes intermittently operable means for rotating the anvil roll.

14. The improved veneer clipper of claim 13 wherein the drive means includes clutch means.

15. The improved veneer clipper of claim 14 including first actuating means synchronized with the reciprocation of the knife for actuating the braking means.

16. The improved veneer clipper of claim 15 including second actuating means for preventing actuation of the clutch means while the knife is being reciprocated.

* * * * *